(12) United States Patent
Sato et al.

(10) Patent No.: US 10,323,558 B2
(45) Date of Patent: Jun. 18, 2019

(54) EXHAUST GAS PURIFICATION APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Masaaki Sato, Susono (JP); Shigeki Nakayama, Gotenba (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 60 days.

(21) Appl. No.: 15/593,602

(22) Filed: May 12, 2017

(65) Prior Publication Data
US 2017/0335733 A1 Nov. 23, 2017

(30) Foreign Application Priority Data
May 18, 2016 (JP) .................................. 2016-099629

(51) Int. Cl.
| | | |
|---|---|---|
| *F01N 3/20* | (2006.01) | |
| *F01N 3/08* | (2006.01) | |
| *F01N 9/00* | (2006.01) | |
| *F01N 13/00* | (2010.01) | |

(52) U.S. Cl.
CPC ........... *F01N 3/208* (2013.01); *F01N 3/0814* (2013.01); *F01N 3/0842* (2013.01); *F01N 9/00* (2013.01); *F01N 13/009* (2014.06); *F01N 2610/02* (2013.01); *F01N 2900/1614* (2013.01); *F01N 2900/1622* (2013.01); *F01N 2900/1814* (2013.01); *Y02T 10/24* (2013.01); *Y02T 10/47* (2013.01)

(58) Field of Classification Search
CPC .... F01N 13/009; F01N 3/0814; F01N 3/0842; F01N 3/208; F01N 9/00; F01N 2610/02; F01N 2900/1614; F01N 2900/1622; F01N 2900/1814; Y02T 10/24; Y02T 10/47
See application file for complete search history.

(56) References Cited

U.S. PATENT DOCUMENTS

| | | | |
|---|---|---|---|
| 2006/0010857 A1* | 1/2006 | Hu | ........................ F01N 3/035 60/286 |
| 2006/0184307 A1* | 8/2006 | Kosaka | ................... F01N 3/208 701/110 |
| 2010/0050601 A1 | 3/2010 | Nakamura | |

FOREIGN PATENT DOCUMENTS

| | | |
|---|---|---|
| CN | 1821716 A | 8/2006 |
| JP | 2001-123826 | 5/2001 |
| JP | 2002-371831 | 12/2002 |
| JP | 2007-321671 | 12/2007 |

(Continued)

*Primary Examiner* — Brandon D Lee
(74) *Attorney, Agent, or Firm* — Finnegan, Henderson, Farabow, Garrett & Dunner, LLP

(57) ABSTRACT

An exhaust gas purification apparatus for an internal combustion engine comprises an ammonia supplier which includes a storage unit configured to store a precursor of ammonia or ammonia (reducing agent or the like), and a controller programmed to carry out output restriction control as such control that an output of the internal combustion engine is restricted to be not more than a predetermined output such that a NOx purification rate brought about by the storage reduction NOx catalyst is within an allowable range if an amount of the reducing agent or the like stored in the storage unit is less than a predetermined storage amount.

4 Claims, 5 Drawing Sheets

(56) References Cited

FOREIGN PATENT DOCUMENTS

JP           2013-160104      8/2013
WO    WO 2014/108619 A1    7/2014

* cited by examiner

EXHAUST GAS PURIFICATION APPARATUS FOR INTERNAL COMBUSTION ENGINE

CROSS REFERENCE TO RELATED APPLICATIONS

This application claims priority to Japanese Patent Application No. 2016-099629 filed on May 18, 2016, the entire contents of which are incorporated by reference herein.

TECHNICAL FIELD

The present disclosure relates to an exhaust gas purification apparatus for an internal combustion engine.

BACKGROUND ART

An SCR system is known, which is provided with a selective catalytic reduction NOx catalyst (hereinafter referred to as "SCR catalyst" as well), wherein NOx, which is contained in the exhaust gas of an internal combustion engine, is purified by using ammonia as a reducing agent. An addition valve, which supplies an aqueous urea solution (urea-water solution) into the exhaust gas, is installed in some cases on the upstream side from the SCR catalyst. The aqueous urea solution, which is added into the exhaust gas, is hydrolyzed by the heat of the exhaust gas and the heat of the SCR catalyst, and the aqueous urea solution is converted into ammonia which is adsorbed by the SCR catalyst. The aqueous urea solution is stored, for example, in a tank, and the aqueous urea solution is finite. Therefore, it is necessary to replenish the tank with the aqueous urea solution, for example, by a user. If the aqueous urea solution is used up without performing the replenishment with the aqueous urea solution, the reducing agent cannot be supplied to the SCR catalyst. Therefore, it is feared that NOx may be released into the atmospheric air.

In this context, a technique is known, in which a warning is given if the remaining amount of the aqueous urea solution is decreased, and the output of an internal combustion engine is thereafter restricted in a stepwise manner in response to the remaining amount of the aqueous urea solution (see, for example, Patent Literature 1). Further, the following technique is known. That is, an SCR catalyst is provided, and a storage reduction NOx catalyst (NOx storage reduction catalyst) (hereinafter referred to as "NSR catalyst" as well), which occludes NOx contained in the exhaust gas and which reduces NOx if the air-fuel ratio of the exhaust gas is not more than the theoretical air-fuel ratio, is provided, wherein the NSR catalyst is principally used if the remaining amount of the aqueous urea solution is decreased (see, for example, Patent Literature 5).

PRIOR ART LITERATURES

Patent Literatures

Patent Literature 1: Japanese Patent Application Laid-Open No. 2013-160104
Patent Literature 2: Japanese Patent Application Laid-Open No. 2007-321671
Patent Literature 3: Japanese Patent Application Laid-Open No. 2002-371831
Patent Literature 4: Japanese Patent Application Laid-Open No. 2001-123826
Patent Literature 5: International Publication No. 2014/103619

SUMMARY

Problems

When the remaining amount of the aqueous urea solution is decreased, even if the output of the internal combustion engine is restricted, then the aqueous urea solution is eventually used up unless the replenishment is performed with the aqueous urea solution. If the internal combustion engine is operated in a state in which the aqueous urea solution is used up, it is feared that it may be difficult to purify NOx. Further, the restart of the internal combustion engine is prohibited in some cases when the aqueous urea solution is used up, depending on the country or the region. In this case, it is feared that the internal combustion engine cannot be restarted after stopping the internal combustion engine until the replenishment is performed with the aqueous urea solution. Further, when the remaining amount of the aqueous urea solution is decreased, even if the control to principally use the NSR catalyst is carried out, than it is feared that it may be difficult to purify NOx with only the NSR catalyst depending on the NOx amount emitted or discharged from the internal combustion engine.

The present disclosure has been made taking the foregoing problems into consideration, an object of which is to suppress the release of NOx into the atmospheric air even when a sufficient amount of a reducing agent cannot be supplied to a selective catalytic reduction NOx catalyst.

Means for Solving the Problems

In order to achieve the object as described above, an exhaust gas purification apparatus for an internal combustion engine comprises a storage reduction NOx catalyst which is provided for an exhaust passage of the internal combustion engine; a selective catalytic reduction NOx catalyst which is provided for the exhaust, passage and configured to selectively reduce NOx by using ammonia as a reducing agent; an ammonia supplier which includes a storage unit configured to store a precursor of ammonia or ammonia, and the ammonia supplier configured to supply ammonia to the selective catalytic reduction NOx catalyst; and a controller programmed to carry out output restriction control as such control that an output of the internal combustion engine is restricted to be not more than a predetermined output such that a NOx purification rate brought about by the storage reduction NOx catalyst is within an allowable range if an amount of the precursor of ammonia or ammonia stored in the storage unit is less than a predetermined storage amount.

Even in the case of the SCR system which is provided with the selective catalytic reduction NOx catalyst (SCR catalyst) for purifying NOx by using ammonia, the system can further comprise the storage reduction NOx catalyst (NOx storage reduction catalyst) (NSR catalyst) as the catalyst other than the SCR catalyst. When the system further comprises the NSR catalyst in addition to the SCR catalyst, it is possible to purify NOx by means of the SCR catalyst and the NSR catalyst. Therefore, even when the NOx purification rate is lowered in one of the catalysts, it is possible to compensate the decrease in the NOx purification rate by means of the other catalyst. In this context, the reducing agent for reducing NOx differs between the SCR catalyst and the NSR catalyst. Therefore, even when the reducing agent, which is to be supplied to the SCR catalyst, is in short supply, the reducing agent can be supplied to the NSR catalyst in some cases. For example, when the reducing agent is supplied to the NSR catalyst by allowing the air-fuel ratio of the internal combustion engine to be not more than the theoretical air-fuel ratio, the reducing agent can be supplied to the NSR catalyst as long as the internal combustion engine is operated. On the other hand, when the reducing agent is supplied to the NSR catalyst by adding the fuel for the internal combustion engine into the exhaust gas, the reducing agent can be supplied to the NSR catalyst as long as the fuel for the internal combustion engine exists.

However, there is a limit to the capacity of the NSR catalyst provided for the SCR system as well. On this account, when it is intended to purify NOx by using the NSR catalyst, NOx, which is in an amount larger than the NOx amount capable of being purified by the NSR catalyst, may flow into the NSR catalyst. In such a situation, it is impossible to completely purify NOx by means of the NSR catalyst. On the contrary, the amount of NOx, which cannot be completely purified by the NSR catalyst, can be decreased by decreasing the NOx amount emitted or discharged from the internal combustion engine. Accordingly, it is possible to decrease the amount of NOx released into the atmospheric air without stopping the internal combustion engine. In this context, the combustion gas temperature can be lowered by lowering the output of the internal combustion engine. Therefore, it is possible to reduce the amount of production of NOx. That is, it is possible to decrease the NOx amount flowing out from the NSR catalyst by lowering the output of the internal combustion engine. Further, the predetermined storage amount is the lower limit value of the amount of the precursor of ammonia or ammonia at which NOx can be sufficiently purified by the SCR catalyst even when the output restriction control is not carried out. Note that the predetermined storage amount may be the lower limit value of the amount of the precursor of ammonia or ammonia at which the NOx purification rats of the SCR catalyst is within the allowable range. The allowable range of the NOx purification rate of the NSR catalyst may be determined, for example, on the basis of laws and regulations.

Further, the controller can carry out the output restriction control if the amount of the precursor of ammonia or ammonia stored in the storage unit is less than the predetermined storage amount, and the controller can allow an air-fuel ratio of an exhaust gas flowing into the storage reduction NOx catalyst to be not more than a theoretical air-fuel ratio so as to shorten an interval to carry out rich spike for reducing NOx occluded by the storage reduction NOx catalyst, if the output restriction control is carried out as compared with if the output restriction control is not carried out.

The interval to carry out the rich spike referred to herein may be a period ranging from a point in time at which the rich spike is started to a point in time at which the next rich spike is started, or the interval may be a period ranging from a point in time at which the rich spike is terminated to a point in time at which the next rich spike is started. The rich spike is carried out in order to reduce NOx occluded by the NSR catalyst. When the interval to carry out the rich spike is shortened, such a state is thereby given that the occlusion amount of NOx is relatively small in the NSR catalyst. Accordingly, the occlusion rate of NOx in the NSR catalyst (the ratio of the amount of NOx occluded by the NSR catalyst with respect to the amount of NOx flowing into the NSR catalyst) is raised. Therefore, it is possible to suppress NOx from flowing out from, the NSR catalyst, and hence it is possible to suppress the release of NOx into the atmospheric air more reliably even when it is impossible to supply a sufficient amount of ammonia to the SCR catalyst. Further, it is possible to raise the output to a greater extent, even when the output restriction control is carried out, by shortening the interval to carry out the rich spike. Therefore, it is possible to suppress the decrease in the drivability.

Further, the controller can estimate an amount of NOx occluded by the storage reduction NOx catalyst; the controller can allow an air-fuel ratio of an exhaust gas flowing into the storage reduction NOx catalyst to be not more than a theoretical air-fuel ratio so as to carry out rich spike for reducing NOx occluded by the storage reduction NOx catalyst every time when the amount of NOx estimated by the controller is not less than a first occlusion amount, if the amount of the precursor of ammonia or ammonia stored in the storage unit is not less than the predetermined storage amount; and the controller can carry out the output restriction control and carry out the rich spike every time when the amount of NOx estimated by the controller is not less than a second occlusion amount which is an amount smaller than the first occlusion amount, if the amount of the precursor of ammonia or ammonia stored in the storage unit is less than the predetermined storage amount.

Such a state is brought about that the NOx occlusion amount of the NSR catalyst is relatively small and the NOx occlusion rate is raised, if the rich spike is carried out every time when the amount of NOx estimated by the controller is not less than the second occlusion amount as compared with if the rich spike is carried out every time when the amount of NOx estimated by the controller is not less than the first occlusion amount. Therefore, the NOx occlusion rate of the NSR catalyst is raised. Therefore, even when a sufficient amount of ammonia cannot be supplied to the SCR catalyst, it is possible to more reliably suppress NOx from flowing out from the NSR catalyst.

Further, a total amount of a NOx amount capable of being occluded per unit time by the storage reduction NOx catalyst and a NOx amount capable of being reduced per unit time by the selective catalytic reduction NOx catalyst may be a predetermined NOx amount if the amount of the precursor of ammonia or ammonia stored in the storage unit is not less than the predetermined storage amount in the exhaust gas purification apparatus for the internal combustion engine; a maximum NOx amount capable of being occluded per unit time by the storage reduction NOx catalyst may be smaller than the predetermined NOx amount; and the predetermined output may be an output of the internal combustion engine at which a NOx amount emitted per unit time from the internal combustion engine is not more than the maximum NOx amount.

If the amount of the precursor of ammonia or ammonia stored in the storage unit is not less than the predetermined storage amount, it is possible to supply a sufficient amount of the reducing agent to the SCR catalyst. Therefore, it is possible to purify NOx by means of the both catalysts of the SCR catalyst and the NSR catalyst. In this case, even if the amount of NOx emitted or discharged per unit time from the internal combustion engine is the predetermined NOx amount. It is possible to sufficiently purify NOx. In this context, it is affirmed that the predetermined NOx amount is the NOx amount capable of being treated or processed by the SCR catalyst and the NSR catalyst if the amount of the precursor of ammonia or ammonia stored in the storage unit is not less than the predetermined storage amount. However, there is a limit to the NOx amount capable of being occluded per unit time by the NSR catalyst. That is, if the amount of the precursor of ammonia or ammonia stored in the storage unit is less than the predetermined storage amount, the predetermined NOx amount cannot be occluded per unit time by only the NSR catalyst. On this account, if the amount of NOx emitted per unit time from the internal combustion engine exceeds the maximum NOx amount capable of being occluded per unit time by the NSR catalyst, NOx flows out from the NSR catalyst. On the contrary, if the amount of NOx emitted from the internal combustion engine is not more than the maximum NOx amount capable of being occluded per unit time by the NSR catalyst, it is possible to sufficiently purify NOx by means of the NSR catalyst even when it is impossible to supply a sufficient amount of ammonia to the SCR catalyst. That is, when the output restriction control is carried out, the predetermined output is provided as such an output that the amount of NOx discharged from the internal combustion engine is not more than the maximum NOx amount capable of being occluded per unit time by the NSR catalyst. Thus, it is possible to suppress NOx from flowing out from the NSR catalyst.

Advantageous Effect

According to the present disclosure, it is possible to suppress the release of NOx into the atmospheric air even when a sufficient amount of the reducing agent cannot be supplied to the selective catalytic reduction NOx catalyst.

EMBODIMENTS

An explanation will be made in detail below by way of example with reference to the drawings on the basis of an embodiment about a mode for carrying out the present disclosure. However, for example, the dimension or size, the material, the shape, and the relative arrangement of each of constitutive parts or components described in the embodiment are not intended to limit the scope of the present disclosure only thereto unless specifically noted.

First Embodiment

Figure 1:
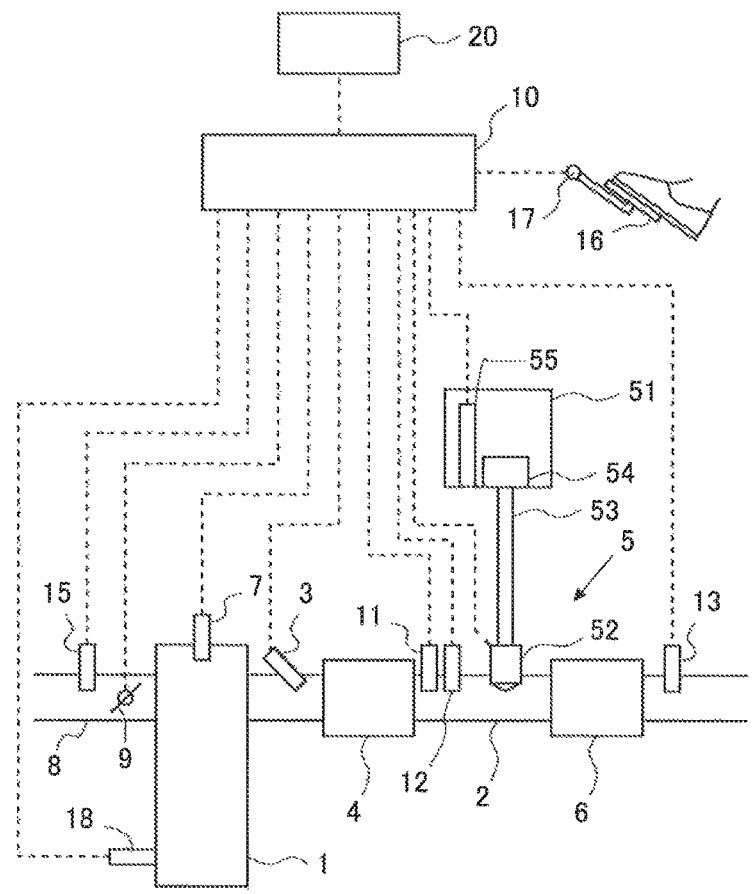
FIG. 1 shows a schematic arrangement of an internal combustion engine according to an embodiment and an intake system and an exhaust system thereof.

FIG. 1 shows a schematic arrangement of an internal combustion engine according to this embodiment, and an intake system and an exhaust, system thereof. The internal combustion engine 1 shown in FIG. 1 is a diesel engine. An exhaust passage 2 is connected to the internal combustion engine 1. A fuel addition valve 3, a storage reduction NOx catalyst 4 (hereinafter referred, to as "NSR catalyst 4"), an aqueous urea solution (urea-water solution) addition valve 52, and a selective catalytic reduction NOx catalyst 6 (hereinafter referred to as "SCR catalyst 6"), which are referred to in this order from the upstream side, are provided at intermediate positions of the exhaust passage 2.

The NSR catalyst 4 occludes NOx contained in the exhaust gas when the oxygen concentration of the inflow exhaust gas is high, while the NSR catalyst 4 releases and reduces occluded NOx when the oxygen concentration of the inflow exhaust gas is lowered and a reducing agent is present. Note that the term "occlusion" is used as a term which also includes the temporary adsorption of NOx.

The fuel addition valve 3 adds the fuel (HC) for the internal combustion engine 1 into the exhaust gas. The fuel is utilized as the reducing agent for reducing NOx by means of the NSR catalyst 4. Note that CO or HC as unburned fuel emitted or discharged from the internal combustion engine 1 can be also utilized as the reducing agent to be supplied to the NSR catalyst 4. That is, the reducing agent can be also supplied to the NSR catalyst 4 by operating the internal combustion engine 1 at the rich air-fuel ratio. In this case, it is unnecessary to provide the fuel addition valve 3.

The SCR catalyst 6 selectively reduces NOx by using previously adsorbed ammonia. The aqueous urea solution addition valve 52 supplies the reducing agent (ammonia) to the SCR catalyst 6 by adding the aqueous urea solution. The aqueous urea solution, which is added from the aqueous urea solution addition valve 52, is hydrolyzed by the heat of the exhaust gas or the heat coming from the SCR catalyst 6, and the aqueous urea solution is converted into ammonia which is adsorbed to the SCR catalyst 6. Note that an addition valve, which adds ammonia, may be provided in place of the aqueous urea solution addition valve 52. That, is, the precursor of ammonia or ammonia may be added into the exhaust gas at the position upstream from the SCR catalyst 6.

The aqueous urea solution addition valve 52 is a part of a reducing agent supply device 5. The reducing agent supply device 5 is provided with a tank 51, the aqueous urea solution addition valve 52, an aqueous urea solution passage 53, a pump 54, and a remaining amount sensor 55.

The tank 51 stores the aqueous urea solution. The aqueous urea solution addition valve 52 is attached to the exhaust passage 2 at the position upstream from the SCR catalyst 6. The aqueous urea solution passage 53 connects the tank 51 and the aqueous urea solution addition valve 52 so that the aqueous urea solution flows therethrough. Note that in this embodiment, the tank 51 corresponds to the storage unit according to the present disclosure. Further, in this embodiment, the reducing agent supply device 5 corresponds to the ammonia supplier according to the present disclosure.

The pump 54 is provided in the tank 51 to discharge the aqueous urea solution from the side of the tank 51 to the side of the aqueous urea solution addition valve 52. Note that the pump 54 may be provided for the aqueous urea solution passage 53 in place of the inside of the tank 51. The pump 54 is an electric pump (motor pump) which is rotated by supplying the electric power. When the pump 54 is operated, and the aqueous urea solution addition valve 52 is opened, then the aqueous urea solution is thereby fed under the pressure through the aqueous urea solution passage 53, and the aqueous urea solution is added into the exhaust gas. Further, the remaining amount sensor 55 is attached to the tank 51, and the remaining amount sensor 55 detects the remaining amount of the aqueous urea solution in the tank 51.

Further, a temperature sensor 11 for detecting the temperature of the exhaust gas and a first NOx sensor 12 for detecting the NOx concentration in the exhaust gas are attached to the exhaust passage 2 at positions downstream from the NSR catalyst 4 and upstream from the aqueous urea solution addition valve 52. It is possible to calculate the temperature of the NSR catalyst 4 or the temperature of the SCR catalyst 6 on the basis of the detection value of the temperature sensor 11. Further, the detection value of the temperature sensor 11 may be regarded as the temperature of the NSR catalyst 4 or the SCR catalyst 6. Further, a second NOx sensor 13 for detecting the NOx concentration in the exhaust gas is attached to the exhaust passage at a position downstream from the SCR catalyst 6. The NOx concentration in the exhaust gas flowing out from the SCR catalyst 6 is detected by the second NOx sensor 13. Note that the NOx concentration in the exhaust gas flowing into the NSR catalyst 4 relates to the operation state of the internal combustion engine 1. Therefore, it is possible to estimate the NOx concentration in the exhaust gas flowing into the NSR catalyst 4 on the basis of the operation state of the internal combustion engine 1. However, it is also possible to detect the NOx concentration in the exhaust gas flowing into the NSR catalyst 4 by providing a NOx sensor on the upstream side from the NSR catalyst 4.

Further, a fuel injection valve 7 for supplying the fuel to the internal combustion engine 1 is attached to the internal combustion engine 1. Further, an intake passage 8 is connected to the internal combustion engine 1. A throttle 9 for adjusting the intake air amount of the internal combustion engine 1 is provided at an intermediate position of the intake passage 8. Further, an air flow meter 15 for detecting the intake air amount of the internal combustion engine 1 is attached to the intake passage 8 at a position upstream from the throttle 9.

ECU 10, which is an electronic control unit for controlling the internal combustion engine 1, is provided in combination with the internal combustion engine 1 constructed as described above. ECU 10 controls the internal combustion engine 1 in response to the operation condition of the internal combustion engine 1 and the request of the driver. Other than the sensors described above, those connected via electric wirings to ECU 10 are an accelerator opening degree sensor 17 which outputs an electric signal corresponding to the pedaling amount of an accelerator pedal 16 pedaled by the driver to detect the engine load, and a crank position sensor 18 which detects the engine rotation speed. Output signals of various sensors as described above are inputted into ECU 10. On the other hand, the fuel addition valve 3, the aqueous urea solution addition valve 52, the fuel injection valve 7, and the throttle 9 are connected to ECU 10 via electric wirings. These devices are controlled by ECU 10. Further, a display 20 is connected to ECU 10. A warning or the like is displayed on the display 20 as described later on in accordance with the instruction from ECU 10. Note that in this embodiment, the warning or the like is displayed on the display 20. However, in place thereof, the warning may be given by means of any sound, and/or a warning lamp may be lighted or turned ON.

The exhaust gas purification apparatus according to this embodiment adopts the SCR system in which NOx is purified by the SCR catalyst 6. The exhaust gas purification apparatus further comprises the NSR catalyst 4 in addition to the SCR catalyst 6. In the case of the SCR system, ammonia is adsorbed to the SCR catalyst 6 beforehand in order to reduce NOx contained in the exhaust gas allowed to pass through the SCR catalyst 6. ECU 10 allows the SCR catalyst 6 to adsorb ammonia by adding the aqueous urea solution from the aqueous urea solution addition valve 52.

Usually, the addition of the aqueous urea solution from the aqueous urea solution addition valve 52 is carried out so that the adsorption amount of ammonia adsorbed by the SCR catalyst 6 is a predetermined adsorption amount. In this case, the amount of addition of the aqueous urea solution from the aqueous urea solution addition valve 52 is determined depending on the amount of NOx flowing into the SCR catalyst 6 as follows. Note that the term "usually" referred to herein refers to the situation in which the remaining amount of the aqueous urea solution in the tank 51 is sufficient. The amount of NOx flowing into the SCR catalyst 6 is equal to the amount of NOx flowing out from the NSR catalyst 4. The amount of NOx flowing into the SCR catalyst 6 can be calculated on the basis of the detection values of the first NOx sensor 12 and the air flow meter 15. As described above, the addition of the aqueous urea solution from the aqueous urea solution addition valve 52 is carried out so that the adsorption amount of ammonia adsorbed by the SCR catalyst 6 is the predetermined adsorption amount. The predetermined adsorption amount is such an amount that the NOx purification rate brought about by the SCR catalyst 6 is within an allowable range, and the amount of ammonia flowing out from the SCR catalyst 6 is within an allowable range. The NOx purification rate brought about by the SCR catalyst 6 is the ratio of the amount of NOx reduced by the SCR catalyst 6 with respect to the amount of NOx flowing into the SCR catalyst 6. The amount of decrease in the adsorption amount of ammonia adsorbed by the SCR catalyst 6 can be calculated on the basis of the amount of NOx flowing into the SCR catalyst 6. Therefore, the aqueous urea solution is added from the aqueous urea solution addition valve 52 so that the amount of decrease in the adsorption amount of ammonia is compensated. The relationship between the amount of decrease in the adsorption amount of ammonia adsorbed by the SCR catalyst 6 and the amount of addition of the aqueous urea solution from the aqueous urea solution addition valve 52 can be previously determined, for example, by means of any experiment or simulation.

Figure 2:
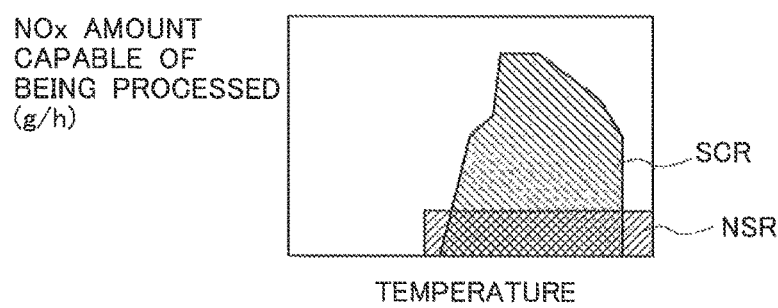
FIG. 2 shows a relationship between the temperatures of an NSR catalyst and an SCR catalyst and the NOx amounts capable of being treated or processed by the respective catalysts.

FIG. 2 shows a relationship between the temperatures of the NSR catalyst 4 and the SCR catalyst 6 and the NOx amounts capable of being treated or processed by the respective catalysts. The area indicated by "SCR" is the range of the NOx amount capable of being processed or treated by the SCR catalyst 6, and the area indicated by "NSR" is the range of the NOx amount capable of being processed or treated by the NSR catalyst 4. In this embodiment, the SCR system is adopted; in which NOx is principally purified by the SCR catalyst 6. Therefore, the capacity of the NSR catalyst 4 is small as compared with the SCR catalyst 6, and the NSR catalyst 4 purifies NOx in an auxiliary manner. On this account, the NOx amount capable of being treated or processed by the NSR catalyst 4 is small as compared with the SCR catalyst 6.

Further, for example, ECU 10 controls the fuel injection valve 7 so that the air-fuel ratio in the cylinder is the target air-fuel ratio. The target air-fuel ratio is the air-fuel ratio which is set depending on the operation state of the internal combustion engine 1. Note that the internal combustion engine 1 according to this embodiment is operated at a lean air-fuel ratio. Therefore, the target air-fuel ratio in the cylinder is set to a lean air-fuel ratio. However, the so-called rich spike, which is such a process that the air-fuel ratio of the exhaust gas flowing into the NSR catalyst 4 is temporarily lowered to be not more than the theoretical air-fuel ratio to reduce NOx occluded by the NSR catalyst 4 by adding the fuel from the fuel addition valve 3, is carried out during the reduction of NOx occluded by the NSR catalyst 4. Note that the rich spike may be carried out by temporarily lowering the target air-fuel ratio in the cylinder to be not more than the theoretical air-fuel ratio by adjusting the amount of the fuel injected from the fuel injection valve 7 in place of the addition of the fuel from the fuel addition valve 3.

Usually, the rich spike is carried out so that NOx in the first occlusion amount is reduced when the NOx occlusion amount in the NSR catalyst 4 is the first occlusion amount. The term "usually" referred to herein refers to such a situation that the remaining amount of the aqueous urea solution in the tank 51 is sufficient, i.e., such a situation that NOx is sufficiently purified even by the SCR catalyst 6. The NOx occlusion amount in the NSR catalyst 4 can be determined, for example, by adding up the value determined by subtracting the NOx amount flowing out from the NSR catalyst 4 and the NOx amount reduced by the NSR catalyst 4 from the NOx amount flowing into the NSR catalyst 4. The NOx amount flowing into the NSR catalyst 4 is estimated on the basis of the operation state of the internal combustion engine 1. The NOx amount flowing out from the NSR catalyst 4 can be determined on the basis of the detection values of the first NOx sensor 12 and the air flow meter 15. The NOx amount reduced by the NSR catalyst 4, i.e., the NOx occlusion amount decreased by the rich spike is relevant to the temperature of the NSR catalyst 4, the detection value of the air flow meter 15, and the air-fuel ratio of the exhaust gas. Therefore, when the relationship thereamong is previously determined, for example, by means of any experiment or simulation, it is thereby possible to calculate the NOx amount reduced by the NSR catalyst 4 on the basis of the temperature of the NSR catalyst 4, the detection value of the air flow meter 15, and the air-fuel ratio of the exhaust gas. Note that the NOx occlusion amount of the NSR catalyst 4 may be calculated by any other well-known method, without being limited to the method described above. In this embodiment, ECU 10 calculates the NOx occlusion amount of the NSR catalyst 4, and thus ECU 10 functions as the controller according to the present disclosure. In the following description, the NOx occlusion amount calculated by ECU 10 is also referred to as "estimated NOx occlusion amount".

By the way, there is a limit to the aqueous urea solution stored in the tank 51. On this account, the remaining amount of the aqueous urea solution is progressively decreased every time when the aqueous urea solution is added from the aqueous urea solution addition valve 52 unless the tank 51 is replenished with the aqueous urea solution. Then, when the remaining amount of the aqueous urea solution in the tank 51 is decreased, and it becomes impossible to add a sufficient amount of the aqueous urea solution from the aqueous urea solution addition valve 52, then it becomes impossible to supply any sufficient amount of ammonia to the SCR catalyst 6. Even when the internal combustion engine 1 is started when the remaining amount of the aqueous urea solution is small, it is difficult to purify NOx by the SCR catalyst 6 during the operation thereof. Therefore, it is feared that NOx may pass through the SCR catalyst 6, and NOx may be released into the atmospheric air. For example, even when the NOx amount, which can be purified per unit time by the NSR catalyst 4 and the SCR catalyst 6, is the predetermined NOx amount when the remaining amount of the aqueous urea solution is sufficiently large, then the NOx amount, which can be purified per unit time, is smaller than the predetermined NOx amount, because NOx is purified by only the NSR catalyst 4 when the remaining amount of the aqueous urea solution is small. That is, when the remaining amount of the aqueous urea solution is not sufficient, NOx is processed or treated by means of only the NSR catalyst 4. Therefore, the NOx amount, which can be processed per unit time when the rich spike is not carried out, is the maximum NOx amount capable of being occluded per unit time by the NSR catalyst 4. The maximum NOx amount is smaller than the predetermined NOx amount described above. Further, it is feared that the internal combustion engine 1 cannot be started until the tank 51 is replenished with the aqueous urea solution if ECU 10 is constructed such that the internal combustion engine 1 cannot be stated in a state in which any sufficient amount of ammonia cannot be supplied to the SCR catalyst 6 and the NOx purification rate is lowered. Therefore, it becomes difficult for the vehicle to run.

In view of the above, in this embodiment, if the remaining amount of the aqueous urea solution is less than the predetermined storage amount, then the output restriction control is carried out for the internal combustion engine 1 as described later on, and thus the NOx amount emitted from the internal combustion engine 1 is adjusted by ECU 10. The predetermined storage amount is the lower limit value of the aqueous urea solution amount at which it is possible to sufficiently purify NOx by the SCR catalyst 6 even when the output restriction control for the internal combustion engine 1 described later on is not carried out, or the lower limit value of the aqueous urea solution amount at which the NOx purification rate of the SCR catalyst 6 is within an allowable range. Therefore, when the remaining amount of the aqueous urea solution is less than the predetermined storage amount, if the output restriction control for the internal combustion engine 1 described later on is not carried out, then it becomes difficult to sufficiently purify NOx emitted from the internal combustion engine 1. In view of the above, in order to restrict the NOx amount emitted from the internal combustion engine 1, ECU 10 carries out the output restriction control so that the output of the internal combustion engine 1 is restricted to be not more than the predetermined output. The predetermined output is the output at which the NOx purification rate of the NSR catalyst 4 is within an allowable range. Note that the output of the internal combustion engine 1 may be restricted so that the NOx amount emitted per unit time from the internal combustion engine 1 is not more than the maximum NOx amount capable of being occluded per unit time by the NSR catalyst 4. The NOx purification rate of the NSR catalyst 4 is the ratio of the NOx amount reduced by the NSR catalyst 4 with respect to the NOx amount flowing into the NSR catalyst 4 at the interval to carry out the rich spike, i.e., during the period ranging from a point in time at which the rich spike is started to a point in time at which the next rich spike is started, or the period ranging from a point in time at which the rich spike is terminated to a point in time at which the next rich spike is started. The allowable range of the NOx purification rate is determined, for example, on the basis of laws and regulations.

In this case, it is possible to decrease the fuel amount injected from the fuel injection valve 7 per one cycle by restricting the output of the internal combustion engine 1. Therefore, it is possible to lower the combustion temperature in the cylinder. Accordingly, it is possible to suppress the production of NOx. Therefore, it is possible to decrease the NOx amount emitted, from the internal combustion engine 1. Note that the restriction of the output of the internal combustion engine 1 can include the reduction of the maximum torque of the internal combustion engine 1 and the decrease in the maximum speed of the vehicle. For example, the output of the internal combustion engine 1 may be restricted to be not more than a predetermined output by providing an upper limit for the fuel amount injected from the fuel injection valve 7 per one cycle.

In this way, the output of the internal combustion engine 1 is restricted so that the NOx amount emitted from the internal combustion engine 1 is the amount capable of being sufficiently purified, by the NSR catalyst 4. Accordingly, it is possible to suppress NOx from being released into the atmospheric air even in such a state that the remaining amount of the aqueous urea solution is small and ammonia is insufficient in the SCR catalyst 6. Therefore, it is possible for the vehicle to run while suppressing the release of NOx into the atmospheric air during the period until the tank 51 is replenished with the aqueous urea solution.

Figure 3:
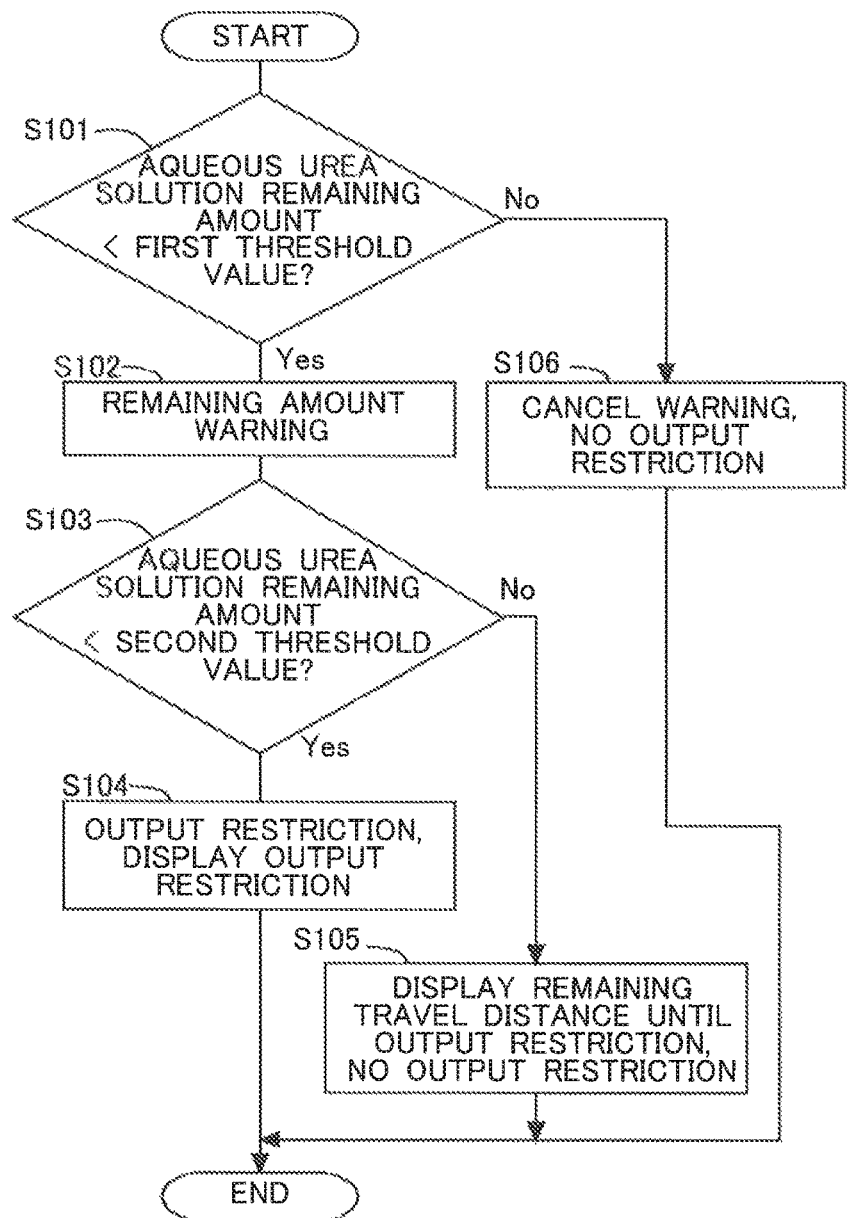
FIG. 3 shows a flow chart illustrating a flow of the output restriction control according to the embodiment.

FIG. 3 shows a flow chart illustrating a flow of the output restriction control according to this embodiment. This flow chart is executed by ECU 10 every time when a predetermined time elapses.

In Step S101, ECU 10 judges whether or not the aqueous urea solution remaining amount is less than a first threshold value. The aqueous urea solution remaining amount is the remaining amount of the aqueous urea solution contained in the tank 51 detected by the remaining amount sensor 55. The first threshold value is the aqueous urea solution remaining amount which is set for the user to facilitate the replenishment with the aqueous urea solution. The first threshold value is the aqueous urea solution remaining amount at which it is necessary to perform the replenishment with the aqueous urea solution. However, it is affirmed that the first, threshold value is the aqueous urea solution remaining amount which is not decreased to such an extent that the output restriction control is to be carried out. Therefore, it is affirmed that in Step S101, it is judged whether or not the replenishment with the aqueous urea solution is required for the tank 51. If the affirmative judgment is made in Step S101, the routine proceeds to Step S102. On the other hand, if the negative judgment is made, the routine proceeds to Step S106.

In Step S102, ECU 10 carries out the remaining amount warning. In Step S102, the fact that it is necessary to perform the replenishment with the aqueous urea solution because the remaining amount of the aqueous urea solution is small is displayed on the display 20. If the process of Step S102 is terminated, the routine proceeds to Step S103.

In Step S103, ECU 10 judges whether or not the aqueous urea solution remaining amount is less than a second threshold value. The second threshold value is the value which is smaller than the first threshold value. The second threshold value is the lower limit value of the aqueous urea solution amount at which it is possible to sufficiently purify NOx by the SCR catalyst 6, or the lower limit value of the aqueous urea solution amount at which the purification rate of the SCR catalyst 6 is within an allowable range. If the aqueous urea solution remaining amount is less than the second threshold value, then the remaining amount of the aqueous urea solution is close to zero, and hence it is impossible to sufficiently purify NOx by the SCR catalyst 6. That is, in Step S103, it is judged whether or not such a state is brought about that NOx cannot be purified by the SCR catalyst 6. If the affirmative judgment is made in Step S103, the routine proceeds to Step S104. On the other hand, if the negative judgment is made, the routine proceeds to Step S105.

In Step S104, ECU 10 restricts the output of the internal combustion engine 1 to be not more than the predetermined output. That is, in Step S104, the output restriction control is carried out so that the NOx amount emitted from the internal combustion engine 1 is the amount capable of being sufficiently purified by the NSR catalyst 4. The restriction of the output of the internal combustion engine 1 is also continued after Step S104 is terminated. In this case, the upper limit is set for the fuel injection amount injected from the fuel injection valve 7, and the fuel injection is carried out so that the fuel injection amount does not exceed the upper limit. The upper limit of the fuel injection amount is set so that the NOx purification rate brought about by the NSR catalyst 4 is within the allowable range. Then, it is affirmed that the predetermined output is the output of the internal combustion engine 1 provided when the fuel injection amount is set to the upper limit. The upper limit of the fuel injection amount is previously determined, for example, by means of any experiment or simulation, and the upper limit of the fuel injection amount is stored beforehand in ECU 10. Further, in this procedure, the fact that the output restriction control is carried out is displayed on the display 20. If the process of Step S104 is terminated, this flow chart is terminated. Note that in this embodiment, ECU 10 performs the process of Step S104, and thus ECU 10 functions as the controller according to the present disclosure. Further, in this embodiment, the second threshold value corresponds to the predetermined storage amount according to the present disclosure.

On the other hand, if the negative judgment is made in Step S103, then the routine proceeds to Step S105, and ECU 10 displays, on the display 20, the travel distance which remains until the output restriction control is carried out (remaining travel distance until the output restriction). The remaining travel distance until the output restriction is the value at which the travel distance is estimated until the aqueous urea solution remaining amount is less than the second threshold value. The relationship between the aqueous urea solution remaining amount and the remaining travel distance until the output restriction is previously determined, for example, by means of any experiment or simulation, and the relationship is stored beforehand in ECU 10. Further, NOx can be purified by the SCR catalyst 6 at the point in time at which the process of Step S105 is performed. Therefore, the output restriction output restriction control is already carried out (for example, if the replenishment is performed with a small amount of the aqueous urea solution when the output restriction control is carried out), the output restriction control is terminated. If the process of Step S105 is terminated, this flow chart is terminated.

Further, if the negative judgment is made in Step S101, and the routine proceeds to Step S106, then ECU 10 terminates the output restriction control when the output restriction control is carried out, and ECU 10 deletes the warning or the like when the warning or the like is displayed on the display 20. The aqueous urea solution remaining amount is not less than the first threshold value, and a sufficient amount of ammonia can be supplied to the SCR catalyst 6 at the point in time at which the process of Step S106 is performed. Therefore, the output restriction control is not carried out in Step S106. Further, it is unnecessary to display, on the display 20, all of the remaining amount warning in Step S102, the output restriction control in Step S104, and the remaining travel distance until the output restriction in Step S105. Therefore, if they are displayed, the display is deleted. If the process of Step S106 is terminated, this flow chart is terminated.

Figure 4:
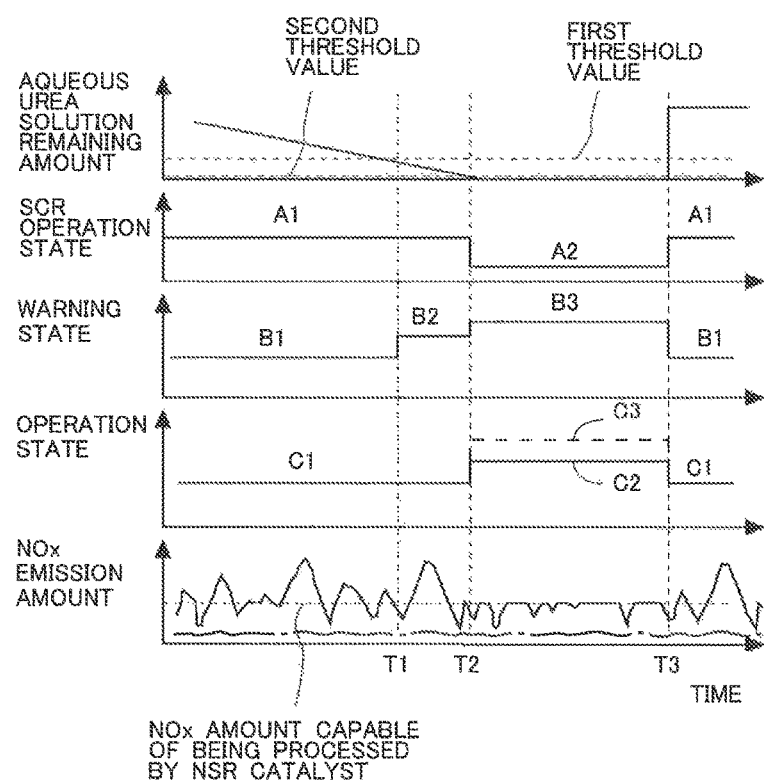
FIG. 4 shows a time chart provided when the output restriction control according to the embodiment is carried out.

In the next place, FIG. 4 shows a time chart provided when the output restriction control according to this embodiment is carried out. The "aqueous urea solution remaining amount" shown in FIG. 4 indicates the remaining amount of the aqueous urea solution in the tank 51. The first threshold value and the second threshold value relevant to the aqueous urea solution remaining amount are the same values as the first threshold value and the second threshold value described above. Further, the SCR operation state indicates the state of the NOx purification of the SCR catalyst 6, wherein A1 indicates a state in which NOx can be purified by the SCR catalyst 6, and A2 shows a state in which NOx cannot be purified by the SCR catalyst 6. The "warning state" shown in FIG. 4 indicates the state of the warning displayed on the display 20, wherein B1 indicates a state in which the warning is not given, B2 indicates a state (Step S102) in which it is warned that the remaining amount is small, and B3 indicates a state (Step S104) in which it is warned that the output restriction control is carried out. The "operation state" shown in FIG. 4 indicates the operation state of the internal combustion engine 1, wherein C1 indicates an ordinary operation state in which the output restriction is not performed, C2 indicates an operation state in which the output restriction is performed for the internal combustion engine 1, and C3 indicates a state in which the restart of the internal combustion engine 1 is prohibited. Further, in relation to the "NOx emission amount" shown in FIG. 4, a solid line indicates the amount of NOx emitted per unit time from the internal combustion engine 1, and an alternate long and short dash line indicates the amount of NOx flowing out per unit time from the SCR catalyst 6. Further, the "NOx amount capable of being treated or processed by NSR catalyst" in relation to the "NOx emission amount" indicates the lower limit value of the NOx amount capable of being treated or processed by the NSR catalyst 4. In this case, the NOx amount capable of being processed by the NSR catalyst 4 may be changed depending on the NOx occlusion amount of the NSR catalyst 4. However, if the output of the internal combustion engine 1 is changed depending on the NOx amount capable of being processed by the NSR catalyst 4, the control becomes complicated. On this account, in this embodiment, the lower limit value of the NOx amount capable of being processed by the NSR catalyst 4 is set as the NOx amount capable of being processed by the NSR catalyst so that NOx can be processed by the NSR catalyst 4 even in a state in which the NOx amount capable of being processed by the NSR catalyst 4 is maximally decreased. The NOx amount capable of being processed by the NSR catalyst can be previously determined, for example, by means of any experiment or simulation.

The aqueous urea solution remaining amount is smaller than the first threshold value at T1 (YES in Step S101). That is, a state is brought about at T1, in which it is necessary to replenish the tank 51 with the aqueous urea solution. Accordingly, the warning state is changed from B1 to B2, and it is displayed on the display 20 that it is necessary to perform the replenishment with the aqueous urea solution because the remaining amount of the aqueous urea solution is small (Step S102). In this situation, the aqueous urea solution still exists, and it is possible to purify NOx by the SCR catalyst 6 in this state. Therefore, the SCR operation state remains A1, and the operation state of the internal combustion engine 1 also remains the ordinary state, i.e., remains C1.

The aqueous urea solution remaining amount is less than the second threshold value at T2 (YES in Step S103). Note that the remaining travel distance until the output restriction is displayed on the display 20 in addition to the fact that it is necessary to perform the replenishment with the aqueous urea solution during the period ranging from T1 to T2 (Step S105). If the aqueous urea solution remaining amount is less than the second threshold value at T2, it becomes impossible to purify NOx by means of the SCR catalyst 6. Therefore, the SCR operation state is changed from A1 to A2. Simultaneously, the output of the internal combustion engine 1 is restricted in order to purify NOx by means of the NSR catalyst 4, and hence the operation state is changed from C1 to C2 (Step S104). Then, it is displayed on the display 20 that the output restriction control is carried out. Therefore, the warning state is changed from B2 to B3 (Step S104).

In this context, in the case of the conventional technique, for example, such a state is brought about that the restart of the internal combustion engine 1 is prohibited at T2 (state of C3 indicated by the broken line in the operation state). Therefore, in the case of the conventional technique, if the internal combustion engine 1 is once stopped at T2 or thereafter, it is impossible to restart the internal combustion engine 1, unless the replenishment is performed with the aqueous urea solution during the period ranging from T1 to T2. Note that it is impossible to purify NOx by means of the SCR catalyst 6 at T2 or thereafter. However, if the vehicle cannot move, it is also difficult to perform the replenishment with the aqueous urea solution. Therefore, it is also allowable that the evacuation traveling can be performed during the period until arrival at a predetermined travel distance.

On the other hand, in this embodiment, the NOx emission amount from the internal combustion engine 1 is suppressed to be not more than the "NOx amount capable of being processed by the NSR catalyst" even during the period at T2 or thereafter. That is, the output restriction is carried out for the internal combustion engine 1 so that NOx can be processed by the NSR catalyst 4 at T2 or thereafter. On this account, it is not needed to prohibit the restart of the internal combustion engine 1. Then, the replenishment with the aqueous urea solution is performed at T3 (NO in Step S101), and thus it is possible to purify NOx by means of the SCR catalyst 6. Therefore, the output restriction control is terminated (Step S106). In this way, even when the restart of the internal combustion engine 1 is prohibited during the period ranging from T2 to T3 in the case of the conventional technique, the restart of the internal combustion engine 1 is not prohibited in the case of this embodiment.

Note that in this embodiment, the output of the internal combustion engine 1 is restricted in order to decrease the NOx amount emitted from the internal combustion engine 1. However, it is also possible to use, in combination, any other means to decrease the NOx amount emitted from the internal combustion engine 1. For example, when an EGR apparatus is provided, it is possible to decrease the NOx amount emitted from the internal combustion engine 1 by increasing the amount of the EGR gas. Further, the combustion temperature is lowered by retarding the timing of the fuel injection from the fuel injection valve 7. Therefore, it is possible to decrease the NOx amount emitted from the internal combustion engine 1. Therefore, the EGR gas amount may be increased or the fuel injection timing may be retarded in combination with the restriction of the output of the internal combustion engine 1.

As explained above, according to this embodiment, the output restriction control is carried out so that NOx can be purified by the NSR catalyst 4 even in the case of such a state that it is impossible to supply a sufficient amount of ammonia to the SCR catalyst 6. Therefore, it is possible to suppress the release of NOx into the atmospheric air while operating the internal combustion engine 1.

Second Embodiment

Figure 5:
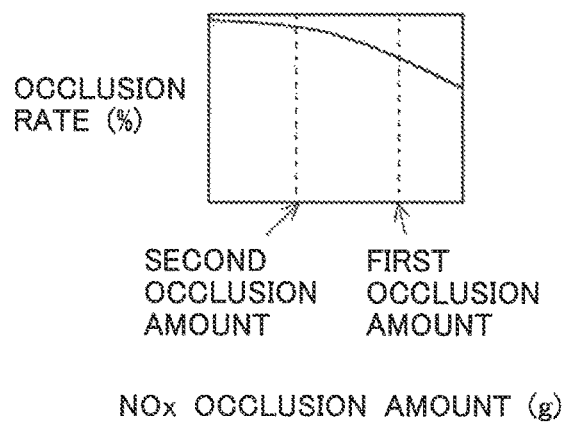
FIG. 5 shows a relationship between the NOx occlusion amount and the NOx occlusion rate of the NSR catalyst.

FIG. 5 shows a relationship between the NOx occlusion amount and the NOx occlusion rate of the NSR catalyst 4. The NOx occlusion rate is the ratio of the NOx amount occluded by the NSR catalyst 4 with respect to the NOx amount flowing into the NSR catalyst 4. As shown in FIG. 5, the larger the NOx occlusion amount is, the more lowered the NOx occlusion rate is. Therefore, the NOx occlusion rate is rather raised in a state in which the NOx occlusion amount is small. As shown in FIG. 5, the NOx occlusion rate is low in some cases in the NSR catalyst 4. Therefore, even when the output restriction control explained in the first embodiment is carried out, a part of NOx is not occluded by the NSR catalyst 4 in some cases.

In this procedure, NOx, which is not occluded by the NSR catalyst 4, flows into the SCR catalyst 6. However, if a sufficient amount of ammonia cannot be supplied to the SCR catalyst 6, it is impossible to purify NOx by the SCR catalyst 6. On this account, NOx, which flows into the SCR catalyst 6, flows out from the SCR catalyst 6 as it is. Therefore, it is preferable to decrease NOx flowing out from the NSR catalyst 4 when it is impossible to supply a sufficient amount of ammonia to the SCR catalyst 6. That is, it is preferable to bring about such a state that the NOx occlusion rate of the NSR catalyst 4 is high.

As shown in FIG. 5, in order that the NOx occlusion rate is in the high state, it is appropriate to bring about such a state that the NOx occlusion amount is small. In this procedure, a state is brought about, in which the NOx occlusion amount is relatively small, by raising the frequency of the rich spike. As explained in the first embodiment, the rich spike is usually carried out so that NOx in the first occlusion amount is reduced when the NOx occlusion amount of the NOx catalyst 4 is the first occlusion amount. On the other hand, in this embodiment, the rich spike is carried out at the NOx occlusion amount which is smaller than the first occlusion amount, when the output restriction control according to the first embodiment is carried out. That is, the rich spike is usually carried out when the NOx occlusion amount arrives at the first occlusion amount. However, when the output restriction control is carried out, the rich spike is carried out when the NOx occlusion amount arrives at the second occlusion amount which is smaller than the first occlusion amount. In this case, the rich spike is carried out so that the NOx in the second occlusion amount can be reduced. As described above, in this embodiment, the NOx occlusion amount of the NSR catalyst 4, which is the threshold value to carry out the rich spike, is changed between when the output restriction control is carried out and when the output restriction control is not carried out.

In this way, the rich spike is carried out every time when the NOx occlusion amount of the NSR catalyst 4 arrives at the second occlusion amount. Thus, a state is brought about, in which the NOx occlusion amount is relatively small. Accordingly, it is possible to raise the NOx occlusion rate. Therefore, the NOx amount, which flows out from the NSR catalyst 4 without being occluded by the NSR catalyst 4, is decreased. On this account, it is possible to more reliably decrease the NOx amount passing through the NSR catalyst 4 and the SCR catalyst 6 and released into the atmospheric air when the output restriction control is carried out.

Figure 6:
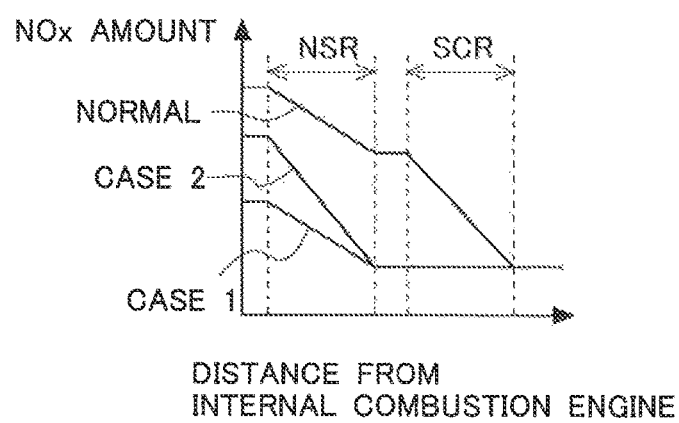
FIG. 6 shows a relationship between the distance on an exhaust passage from the internal combustion engine and the NOx amount per unit volume of the exhaust gas.

FIG. 6 shows a relationship between the distance on the exhaust passage 2 from the internal combustion engine 1 and the NOx amount per unit volume of the exhaust gas. FIG. 6 shows such a situation that the NOx amount per unit volume of the gas emitted or discharged from the internal combustion engine 1 is adjusted so that the NOx amount per unit volume of the exhaust gas flowing out from the SCR catalyst 6 (NOx amount per unit volume of the exhaust gas at the downstream end of the SCR catalyst 6) is an identical amount. The range indicated by "NSR" indicates the range ranging from the upstream end to the downstream end of the NSR catalyst 4, and the range indicated by "SCR" indicates the range ranging from the upstream end to the downstream end of the SCR catalyst 6. "NORMAL" indicates such a situation that NOx can be purified by the NSR catalyst 4 and the SCR catalyst 6. In this case, NOx can be purified by the NSR catalyst 4 and the SCR catalyst 6 respectively. Therefore, even when the NOx amount per unit volume of the gas emitted from the internal combustion engine 1 is relatively large, the NOx amount is sufficiently decreased during the period until arrival at the downstream end of the SCR catalyst 6.

On the other hand, in FIG. 6, "CASE 1" indicates such a situation that only the output restriction control according to the first embodiment is carried out. "CASE 2" indicates such a situation that the frequency of the rich spike according to the second embodiment is raised in addition to the execution of the output restriction control according to the first embodiment. When "CASE 1" and "CASE 2" are compared with each other, there is no difference in the NOx amount, flowing out from the NSR catalyst 4. However, it is possible to suppress the outflow of NOx from the NSR catalyst 4 in "CASE 2" to such an extent that the frequency of the rich spike is raised, even when the NOx amount per unit volume of the gas emitted from the internal combustion engine 1 is larger. Therefore, even when the output restriction control is carried out, it is possible to suppress the deterioration of the drivability, because the output can be more raised in the second embodiment as compared with the first embodiment. In view of the above, in this embodiment, the NOx occlusion amount, which is the threshold value to carry out the rich spike, is decreased so that the interval of the rich spike is shortened (i.e., so that the frequency of the rich spike is raised) when the output of the internal combustion engine 1 is restricted as compared with when the output of the internal combustion engine 1 is not restricted.

Figure 7:
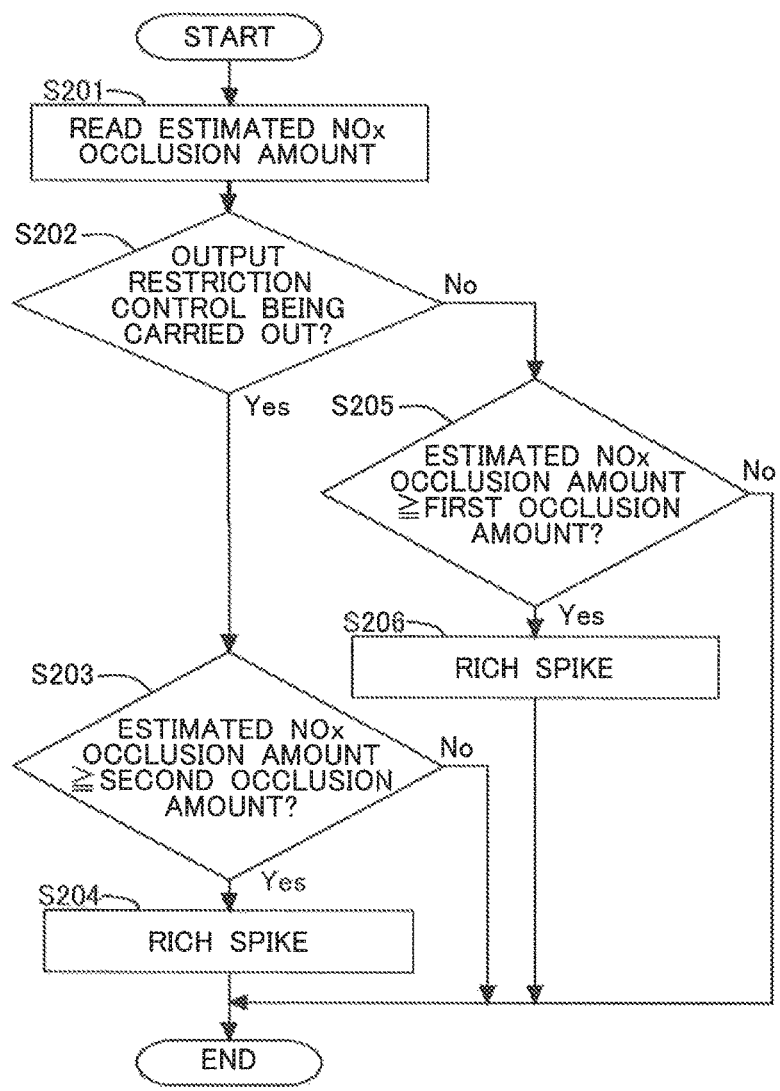
FIG. 7 shows a flow chart illustrating a control flow of the rich spike according to a second embodiment.

FIG. 7 shows a flow chart illustrating a control flow of the rich spike according to this embodiment. This flow chart is carried out by ECU 10 every time when a predetermined period of time elapses. Note that the flow chart shown in FIG. 3 explained in the first embodiment is executed separately from the flow chart shown in FIG. 7.

In Step S201, ECU 10 calculates the NOx occlusion amount of the NSR catalyst 4. ECU 10 calculates the estimated NOx occlusion amount at all times as explained in the first embodiment, and hence the calculated value is read. If the process of Step S201 is terminated, the routine proceeds to Step S202.

In Step S202, ECU 10 judges whether or not the output restriction control is carried out. In Step S202, it is judged whether or not it is necessary to shorten the interval of the rich spike. If the affirmative judgment is made in Step S202, the routine proceeds to Step S203. On the other hand, if the negative judgment is made, the routine proceeds to Step S206.

In Step S203, ECU 10 judges whether or not the estimated NOx occlusion amount read in Step S201 is not less than the second occlusion amount. When the output restriction control is carried out, it is difficult to purify NOx by means of the SCR catalyst 6. Therefore, the interval of the rich spike is shortened so that the NOx occlusion rate of the NSR catalyst 4 is raised. On this account, if the estimated NOx occlusion amount is not less than the second occlusion amount, then the routine proceeds to Step S204, and the rich spike is carried out. That is, if the affirmative judgment is made in Step S203, then the routine proceeds to Step S204, and ECU 10 carries out the rich spike. On the other hand, if the negative judgment is made in Step S203, no opportunity is given to carry out the rich spike. Therefore, this flow chart is terminated.

On the other hand, if the negative judgment is made in Step S202, the routine proceeds to Step S205. In Step S205, ECU 10 judges whether or not the estimated NOx occlusion amount is not less than the first occlusion amount. If the NSR catalyst 4 is normal, and the output restriction control is not carried out, then such a state is brought about that the remaining amount of the aqueous urea solution is sufficiently large, and hence it is possible to sufficiently purify NOx by means of the SCR catalyst 6. On this account, even if the interval of the rich spike is prolonged, and the NOx occlusion rate of the NSR catalyst 4 is lowered on account of the estimated NOx occlusion amount which is not less than the first occlusion amount, then it is possible to purify NOx by means of the SCR catalyst 6. Therefore, if the estimated NOx occlusion amount is not less than the first occlusion amount, then the routine proceeds to Step S206, and the rich spike is carried out. That is, if the affirmative judgment, is made in Step S205, then the routine proceeds to Step S206, and ECU 10 carries out the rich spike. On the other hand, if the negative judgment is made in Step S205, no opportunity is given to carry out the rich spike. Therefore, this flow chart is terminated.

As explained above, according to this embodiment, when the reducing agent cannot be supplied to the SCR catalyst 6, the output of the internal combustion engine 1 is restricted. Further, the interval of the rich spike is shortened, and thus NOx flowing out from the NSR catalyst 4 is decreased. Therefore, NOx flowing into the SCR catalyst 6 is decreased. Accordingly, even in the case of such a state that it is impossible to supply the reducing agent to the SCR catalyst 6, it is possible to move the vehicle while more reliably suppressing the release of NOx into the atmospheric air. Further, the outflow of NOx from the NSR catalyst 4 is suppressed by shortening the interval of the rich spike. Therefore, it is possible to set a larger value for the predetermined output which is the maximum value of the output provided when the output restriction control is carried out.

Note that in this embodiment, the interval of the rich spike is shortened by decreasing the threshold value of the estimated NOx occlusion amount. However, if the rich spike is carried out every time when a predetermined period of time elapses or every time when a predetermined travel distance is provided, then the interval of the rich spike may be shortened by shortening the predetermined period of time or the predetermined travel distance.

The invention claimed is:

1. An exhaust gas purification apparatus for an internal combustion engine, comprising:
    a storage reduction NOx catalyst provided in an exhaust passage of the internal combustion engine;
    a selective catalytic reduction NOx catalyst provided in the exhaust passage and configured to selectively reduce NOx by using ammonia as a reducing agent;
    a storage tank configured to store a precursor of ammonia or ammonia, the storage tank being in flow communication with the exhaust passage upstream of the selective catalytic reduction NOx catalyst, and a valve that regulates flow of an amount of the precursor of ammonia or the ammonia pumped from the tank into the exhaust passage upstream of the selective catalytic reduction NOx catalyst; and
    a controller programmed to restrict an amount of NOx output by the internal combustion engine to be less than or equal to a predetermined output of NOx when an amount of the precursor of ammonia or the ammonia stored in the tank is less than a predetermined storage amount at which a NOx purification rate of the selective catalytic reduction NOx catalyst is within an allowable range for the selective catalytic reduction NOx catalyst, such that a NOx purification rate brought about by the storage reduction NOx catalyst is within an allowable range for the storage reduction NOx catalyst.

2. The exhaust gas purification apparatus for the internal combustion engine according to claim 1, wherein the controller is programmed to control an air-fuel ratio of an exhaust gas flowing into the storage reduction NOx catalyst to be less than or equal to a theoretical air-fuel ratio to carry out a rich spike at a higher frequency for reducing NOx occluded by the storage reduction NOx catalyst when restricting the NOx output by the internal combustion engine as compared with when not restricting the NOx output.

3. The exhaust gas purification apparatus for the internal combustion engine according to claim 1, wherein
    the controller is programmed to:
    estimate an amount of NOx occluded by the storage reduction NOx catalyst;
    control an air-fuel ratio of an exhaust gas flowing into the storage reduction NOx catalyst to be less than or equal to a theoretical air-fuel ratio so as to carry out a rich spike for reducing NOx occluded by the storage reduction NOx catalyst every time when the amount of NOx estimated by the controller is greater than or equal to a first occlusion amount when the amount of the precursor of ammonia or the ammonia stored in the tank is greater than or equal to the predetermined storage amount; and
    restrict the amount of NOx output by the internal combustion engine and carry out the rich spike every time when the amount of NOx estimated by the controller is greater than or equal to a second occlusion amount smaller than the first occlusion amount when the amount of the precursor of ammonia or the ammonia stored in the storage unit is less than the predetermined storage amount.

4. The exhaust gas purification apparatus for the internal combustion engine according to claim 1, wherein:
    a total amount of a NOx amount the storage reduction NOx catalyst is capable of occluding per unit time plus a NOx amount the selective catalytic reduction NOx catalyst is capable of occluding per unit time is a predetermined NOx amount when the amount of the precursor of ammonia or the ammonia stored in the tank is greater than or equal to the predetermined storage amount in the exhaust gas purification apparatus for the internal combustion engine;
    a maximum NOx amount the storage reduction NOx catalyst is capable of occluding per unit time is smaller than the predetermined NOx amount; and the predetermined output of NOx is an output of NOx by the internal combustion engine at which a NOx amount emitted per unit time from the internal combustion engine is less than or equal to the maximum NOx amount that the storage reduction NOx catalyst is capable of occluding per unit time.

* * * * *